United States Patent [19]

Dykes

[11] 4,198,781
[45] Apr. 22, 1980

[54] PLANT DESTRUCTION UTILIZING ELECTRICALLY CONDUCTIVE LIQUID

[75] Inventor: Willis G. Dykes, Vicksburg, Miss.

[73] Assignee: Lasco, Inc., Vicksburg, Miss.

[21] Appl. No.: 930,857

[22] Filed: Aug. 3, 1978

[51] Int. Cl.$^2$ ............................................. A01M 21/04
[52] U.S. Cl. ........................................ 47/1.3; 239/3; 239/708
[58] Field of Search .................. 47/1.3, 1.43, 1.7; 172/6; 239/3, 690–708

[56] References Cited

U.S. PATENT DOCUMENTS

| | | | |
|---|---|---|---|
| 1,854,475 | 4/1932 | Littlefield | 239/3 |
| 2,558,376 | 6/1951 | Opp et al. | 47/1.3 |
| 2,591,597 | 4/1952 | Opp et al. | 47/1.3 |
| 2,951,314 | 9/1960 | Laughlin | 47/1 |
| 3,599,725 | 8/1971 | Gego et al. | 47/1.43 X |
| 3,826,035 | 7/1974 | Paniagua | 47/1.3 X |
| 3,918,123 | 11/1975 | Harben | 17/11 |

*Primary Examiner*—Robert E. Bagwill
*Attorney, Agent, or Firm*—Cushman, Darby & Cushman

[57] ABSTRACT

A machine is provided for destroying plants with electricity comprising a tank adapted to hold electrically conductive liquid, an electrode for placing the electrically conductive liquid in the tank at high electrical potential, including a high voltage source of electricity; nozzles for spraying the electrically conductive liquid on plants to be destroyed; and a structure for grounding the high voltage source. Air pressure provided over the liquid in the tank provides the motive force for spraying, and pneumatically operated valves in line with the nozzles are provided for selectively supplying liquid to the nozzles. In this way, there are no moving parts which are electrically charged. Condition-responsive structures, responsive to plant position, are provided for controlling operation of the pneumatic valves, such as air limit proximity switches. The current output of the high voltage source is limited so that damage to the source is prevented, and the no-load voltage of the high voltage source also is preferably controlled.

18 Claims, 3 Drawing Figures

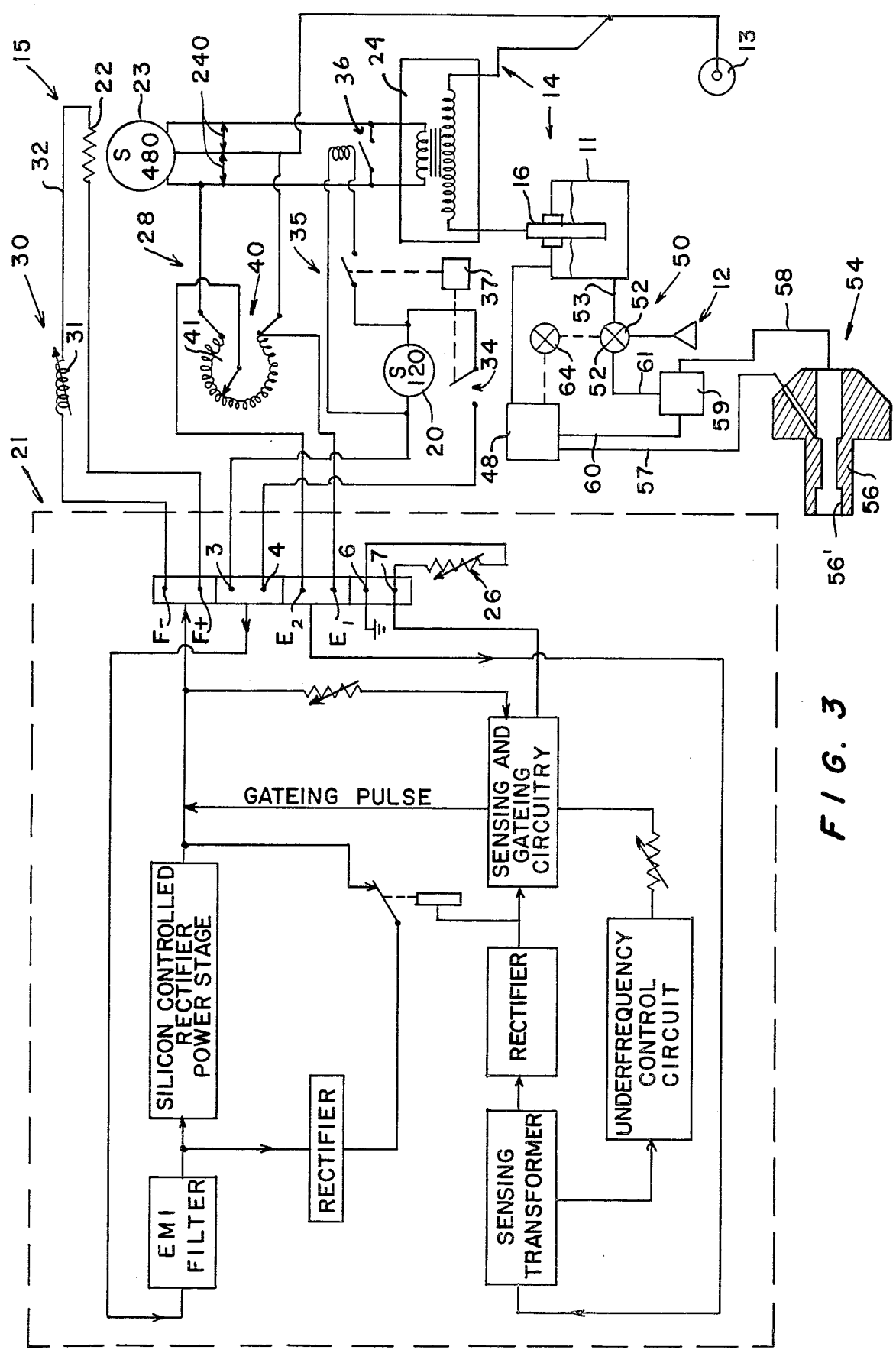

PLANT DESTRUCTION UTILIZING ELECTRICALLY CONDUCTIVE LIQUID

BACKGROUND AND SUMMARY OF THE INVENTION

Under some circumstances, it is desirable to be able to kill only selected plants during weeding, thinning, or the like, and/or to provide for the supply of plant-killing electricity only in particular areas. Additionally, there are situations when the supply of plant-treating liquids is desired in combination with electric destruction of plants. The present invention provides a structure suitable in all of the above situations, the present invention applying high potential electrically conductive liquid onto plants for transferring electricity from a high voltage source to ground through plants that are sprayed.

The basic concept of applying electrically conductive liquid for plant destruction is old, as taught by U.S. Pat. No. 2,558,376. However, heretofore such systems have been designed only for the continuous application of liquid to plants, or to the ground, contain electrically charged movable parts, and are not readily adaptable for commercial operations. Additionally, prior art proposals are susceptible to burnup of the high voltage source, and have limited flexibility.

According to the present invention, a machine for destroying plants with electricity is provided which is very versatile, being utilizable for a large number of plant-killing operations aside from mere broadcast destruction, contains no electrically charged movable parts, can readily electrically isolate the electrically conductive liquid from the rest of the machine, and has provisions for positively preventing high voltage source burnup.

According to the present invention, a machine is provided for destroying plants with electricity which comprises a tank adapted to hold electrically conductive liquid therein; means for placing the conductive liquid in the tank at high electric potential, including a high voltage source of electricity; nozzle means for spraying high potential electrically conductive liquid on plants to be destroyed for transferring electricity from the high voltage source to ground through plants sprayed thereby; and means for grounding the high voltage source. Preferably means are further provided for selectively supplying liquid from the tank to the nozzle means, and condition responsive means—responsive to plant position—can control the selective supply means. The selective supply means preferably comprise pneumatically operated valves in each conductive liquid line for each nozzle. The same air pressure source which is used to operate the pneumatically operated valves also preferably provides air under pressure at the top of the liquid in the conductive liquid tank to provide a pumping action, and also provides the source for a fluid proximity switch which is responsive to plant position for controlling operation of a pneumatically operated valve. Means are also provided for limiting the current output of the high voltage source so that damage thereto is prevented, as well as means for controlling the no-load voltage of the high voltage source to a maximum level.

By utilizing the machine according to the present invention, crop thinning, broadcast destruction of plants, weed thinning with minimum energy comsumption, and combination herbicide and electric treatment or fertilizer and electric treatment are provided for.

It is the primary object of the present invention to provide a versatile machine for destroying plants with high potential electrically conductive liquid. This and other objects of the invention will become clear from an inspection of the detailed description of the invention, and from the appended claims.

BRIEF DESCRIPTION OF THE DRAWINGS

FIG. 3 is a diagrammatic electrical and fluidic circuit diagram illustrating desired electrical and fluidic hookups for the machine of FIGS. 1 and 2.

DETAILED DESCRIPTION OF THE DRAWINGS

Figure 1:
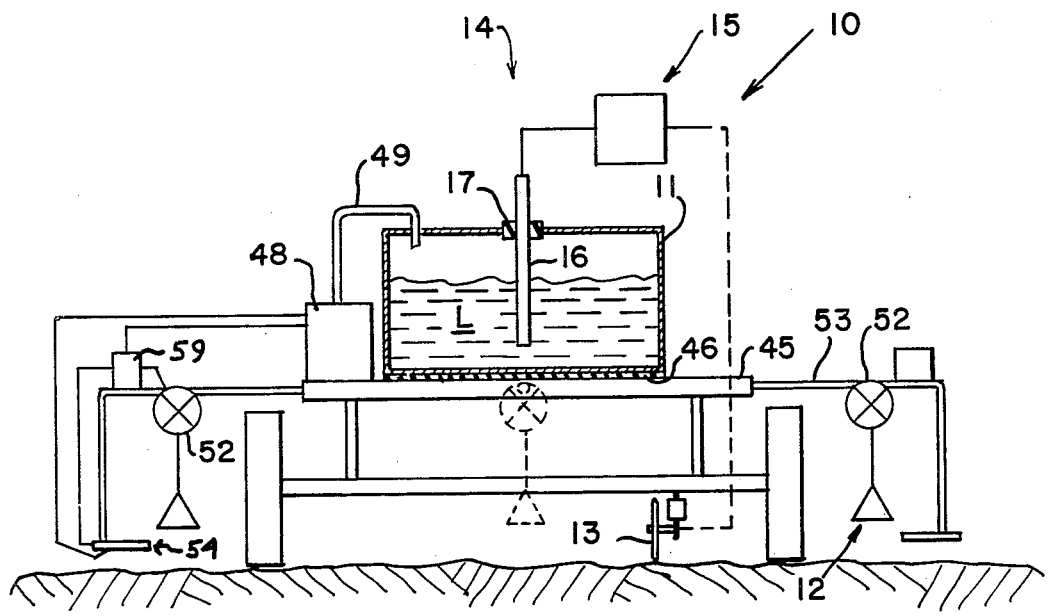
FIG. 1 is a rear schematic view of an exemplary plant destroying machine according to the invention.
Figure 2:
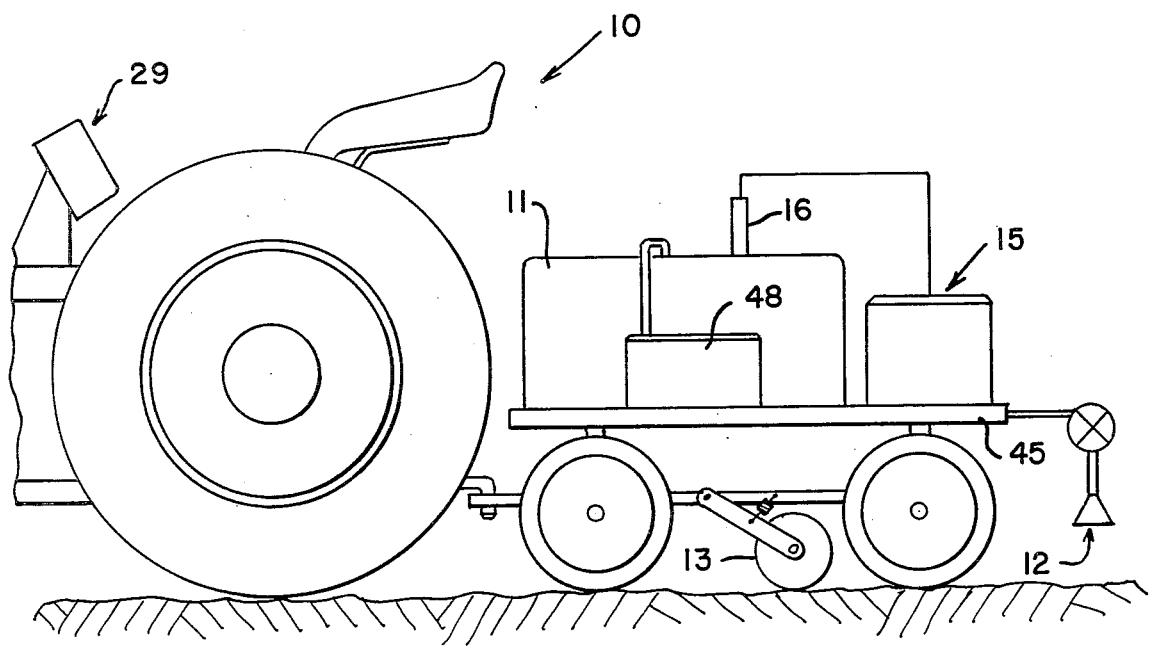
FIG. 2 is a side view of an exemplary machine according to the invention.

An exemplary machine according to the present invention is shown generally at 10 in FIGS. 1 and 2. The machine may be self-propelled or may be an attachment for a conventional tractor, as shown in FIG. 2. The machine includes a tank 11 adapted to hold electrically conductive liquid L therein, means 14 for placing the electrically conductive liquid in the tank 11 at high electrical potential, including a high voltage source of electricity 15, nozzle means 12 for spraying high potential, electrically conductive liquid on plants to be destroyed for transferring electricity from the high voltage source to ground through the plants sprayed thereby, and means 13 for grounding the high voltage source.

The means 14 for placing the conductive liquid in the tank at high electrical potential preferably comprises an electrode 16 extending through a bushing 17 of insulating material into the tank 11, and operatively connected to the high voltage source 15, as shown in FIGS. 1 and 3. The ground 13 preferably comprises one or more retractable grounding wheels, such as shown in U.S. Pat. No. 3,919,806.

The high voltage source 15 preferably includes a generally stable voltage electric power source 20, a voltage regulator 21, a fossil-fuel powered electric generator 23, the voltage regulator 21 being operatively connected to the source 20 and an excitor field 22 for the generator 23, and a step-up transformer 24 operatively connected to the high voltage generator 23. The generator 23 may be a diesel generator capable of generating 480 volts, and the source 20 may be an electric generator that is belt driven from the diesel generator 23. Since the speed of rotation of the power shaft of conventional diesel generators 23 is stable, the source 20 can maintain a generally stable voltage of about 120 volts.

The voltage regulator 21 may be selected from a wide variety of commercially available voltage regulators. The regulator illustrated schematically in FIG. 2 is a Basler KR4FF voltage regulator, which is commercially available from Basler Electric of Highland, Illinois, and has been found to be eminently suited for the present purposes. Such regulators 21 are designed to provide field excertation to generators such that the terminal voltage is regulated to within less than 1% for loads from 0 to full load. This regulation is achieved by sensing the terminal voltage—through sensing circuitry means 28—and using the signal to control the firing of silicon controlled rectifiers which provide the DC inputs to the generator field 22, which is resistive. If the sensed voltage drops below the desired value, the SCR's are fired earlier in each cycle, increasing the field current which increases the generator output current and restores the output to the desired level. If the terminal voltage is not restored, the SCR's are turned on earlier and earlier until the voltage applied to the excitor field 22 is a maximum value as determined by the design of the regulator 21. This is called the "field forcing mode" of operation, and at this point the generator 23 output current may well be 300 to 400% of its rated value. An external voltage adjust rheostat 26 is provided connected across terminals 6 and 7 of the regulator 21, while the sensing circuit 28 is connected to terminals E1 and E2 of the regulator 21, the power source 20 is connected across terminals 3 and 4 of the regulator 21, and the excitor field 22 is connected across terminals F+ and F− of the regulator 21.

In field operation of machine 10, it is desired to limit the current output of the high voltage source 23 so that damage thereto is prevented, since the 300 to 400% of rated value current output of the generator 23 during the "field forcing mode" will soon burn out the generator windings. The loading imposed on the generator 23 for some plant killing applications (especially if a continuous spray is provided or a large number of nozzles are used) is such that the 300 to 400% rated value output current may be achieved in operation. A current limiting means 30 is provided which preferably comprises a variable resistor 31 which is operatively connected in the line 32 between the voltage regulator 21 (contacts F+ and F−) and the excitor field 22. The control for the variable resistor 31 is preferably mounted on a control panel 29 near the driver's seat of the vehicle 10 (see FIG. 2), or other convenient place, so that the total field resistance can be manually adjusted to a level such that with maximum regulator output voltage (field forcing mode) the excitor field current will be limited to a value which will correspond to a nondestructive generator current level. Since the no-load exciting current for rated terminal voltage is normally less than the exciting current for rated (continuous) output current, the no-load voltage of the machine is unaffected by such an arrangement. The resistor 31 may be a 3.5 amp 50 ohm conventionally available resistor.

Also it is desirable to provide an on/off type control of the generator 23 output. For this purpose, a first switch means 34 (such as a double pole single throw normally open 10 amp switch) is provided in series with the source 20, between the source 20 and the voltage regulator 21. However, there is some residual magnetism in the field of the generator 23 so that even with the current effectively terminated to the excitor 22, there is still a small voltage output from the generator 23. When this voltage is applied to the step-up transformer 24, it may wind up to several hundred volts on the secondary side of the transformer 24. In order to eliminate this residual high voltage condition—which may be a safety hazard since rod 16 may still be energized—second switch means 35 are provided to short out the output of the generator with a 50 amp normally open contactor 36. A solid state time delay relay 37 is preferably provided to provide a delay of about one second between the opening of first switch means 34 and second switch means 35. This delay allows the magnetic field to collapse sufficiently before the leads are shorted together so that the contacts do not burn out.

Under some circumstances, the amount of energy delivered to plants is greatly in excess of the minimum levels required to produce a lethal effect, and thus a waste of energy and other adverse side effects. Thus it is desired to provide means 40 for controlling the no-load voltage of the high voltage source 23 and holding it to a maximum level so that the amount of energy applied during the no-load situation to any plants that might be contacted is held to an amount more closely approximating the miminum level required to produce a lethal effect on the plants, and thus conserving energy. Such means 40 preferably comprise a variable transformer 41 disposed in the sensing circuit 28 for the voltage regulator 21, the transformer 41 being capable of reducing the no-load voltage of the source 23 to generally the same level (or slightly above) the full-load current limited voltage of the source 23. Since the terminal voltage is routed through the variable transformer 41 before applying it to the sensing input E1, E2 for the voltage regulator 21, the terminal voltage signal may be multiplied or divided before dispensed by the regulator 21. For instance, if the trnasformer 41 is set at 100% voltage, then the 240 terminal voltage is passed on, full value, into the 120 volt sensing circuit 28. The sensing circuit 28 determines that this voltage is much too high so it reduces the output of the regulator 21 until the voltage being sensed is equal to 120 volts AC. In this case then, the output voltage would be reduced to 120 volts from the nominal 240. Alternatively, assume the transformer is adjusted to 50% voltage the voltage regulator 21 would then adjust its output so that the sensed voltage, which is not 50% of the output voltage, is equal to 120 volts which would then correspond to a full 240 volts at the terminal of the generator 23. Alternatively, if the transformer 41 was set at 25% voltage, the regulator 21 would try to set aside the 120 volts sensing circuit 28 and would provide 120 volts divided by 0.25, or 480 volts at the terminals of the generator 23. The transformer 41 preferably is a STACO model 252 or equivalent, which is capable of adjusting the terminal voltage all the way from zero to 240 volts (100% to 0%). The control for the transformer 41 also preferably is located in the cab of the vehicle 10, along with the control for the first switch means 34 and the variable resistor 31.

The tank 11 preferably rests on a platform portion 45 of the machine 10, and the tank 11 is insulated from the rest of the machine, as by providing an insulating pad 46 or the like, and otherwise insulating the tank 11. The motive force for moving conductive liquid from the tank 11 to the nozzle means 12 preferably comprises an air pressure source 48 which introduces air through an insulated air pressure line 49 or the like into the top of the tank 11 in the head H area.

The machine 10 also preferably comprises means 50 for selectively supplying liquid from the tank 11 to the nozzle means 12. The means 50 includes a pneumatically operated valve 52 disposed in a line 53 from the tank 11 to each nozzle means 12, and additionally may comprise a condition responsive means 54 responsive to plant position for controlling the pneumatically actuated valve 52. The line 53 is of course of electrically nonconductive material, and because a completely pneumatic system is provided for control of the pneumatically actuated valves 52, and air pressure provides the motive force for moving the liquid, no moving parts of the liquid distribution system are at high potential.

The condition responsive means 54 preferably utilizes air from the air pressure source 48 for both sensing and control of the valves 52. The means 54 includes a proximity switch 56 associated with each nozzle means 12 and associated valve 52. The proximity switch may be selected from a wide variety of fluidic-type proximity switches, such as a Northeast Fluidics Model 1022. Supply air enters switch 56 from line 57, which is connected up to air pressure source 48, and output line 58 leads from switch 56 to a fluid amplifier 59. When an object is within the design distance of the sensing nozzle 56' of the proximity switch 60, the normal air flow from line 57 out through nozzle 56 will be changed sufficiently for a back pressure to be provided through line 58, which pressure leads to the fluid amplifier 59. The fluid amplifier 59, which also is supplied with pressure through line 60 from air pressure source 48, is activated by the relatively small pressure in line 58, and provides an output pressure in line 61 of sufficient magnitude to operate the pneumatically operated valve 52. While a wide variety of components also may be utilized for the fluid amplifier 59 or the like, and the pneumatically operated valve 52, a suitable fluidic amplifier is AscoAmp Model F3611, and a suitable pneumatically operated valve is an Asco F210C73KK. With the condition-responsive means 54, when a plant is detected by the fluidic switch 56, the flow of electrically conductive liquid from tank 11 through nozzle means 12 is initiated and continues until the plant's presence is no longer detected.

Under some circumstances, it is desirable to provide for a continuous spray of liquid from tank 11 through nozzle means 12. In such circumstances, a solenoid operated valve 64 or the like may be provided for providing pressure directly from air pressure source 48 to valve 52. The control for the solenoid operated valve 64 may be provided on the control panel 29.

Depending upon the particular application, the number of nozzle means 12 may be varied, as well as the number of valves 52. Normally, however, one valve and one condition-responsive means 54 will be provided associated with each nozzle means 12. The condition-responsive means 54 can be utilized for detecting plants not in rows, of a particular height with respect to the ground, and depending upon sensitivity a particular distance from a crop row, and the nozzle means 12 may be adjusted to have either a fine or a coarse spray, with either a large delivery volume or small delivery volume, depending upon the particular application. The nature of the conductive liquid used also may vary depending upon the application, and may include water, herbicide, fertilizer, or the like. In a normal application, herbicide is utilized in the water to provide ionization thereof to increase the electrical conductivity, the herbicide of course acting with the electric discharge to effect plant destruction.

An exemplary apparatus according to the present invention now having been described, an examplary method of operation thereof will now be set forth. The following method is only exemplary, and a wide variety of other plant treatment methods can be practiced utilizing the present invention.

The tank 11 is substantially filled with water, and a herbicide is added to the water to facilitate ionization thereof. Air from the air pressure source 48 is supplied to the head H at the top of the tank 11, and the high voltage source 15 supplies current through the electrode 16 to the liquid in tank 11 to place it at high electrical potential. The nozzles 12 and condition-responsive means 54 are set at the desired heights and longitudinal positions for the desired plant destruction being practiced, the grounding wheel(s) 13 is moved into contact with the ground, and the machine 10 is driven over the field to be treated.

When a plant comes within the design distance of the nozzle 56' of the fluidic switch 56, a back pressure is provided through line 58 which actuates fluidic amplifier 59, which in turn actuates pneumatically operated valve 52 to allow liquid to flow from tank 11 under the pressure of the head H to the nozzle means 12 to be sprayed on the plant sensed, and any surrounding area desired, the coarseness of the spray of the nozzle 12 being adjusted depending upon ultimate use. Even if all nozzles 12 are operating at the same time, or if solenoid valve 64 is actuated so that a continuous spray of liquid is provided through all the nozzles 12, the current limiting means 30 will prevent the generator 23 from burning up. The operator adjusts the variable resistor 31 on control panel 29 so that maximum current output of the generator 23 is at a level which will not destroy the generator windings, and the manual transformer 41 of the no-load controlling means 40 is adjusted so that the no-load voltage is generally at the same level as the full load current limited voltage of the generator 23.

When treatment is completed or is to be interrupted, the operator opens the first switch means 34, which through time delay 37 opens the second switch means 35 and closes the 50 amp switch 36 in the generator output 23. The operation of the compressor, or other structure providing the air pressure source 48, may then also be terminated.

It will thus be seen that according to the present invention a versatile machine has been provided for destroying plants with electrically conductive liquid. The machine contains no moving parts that are at high potential, and because of the pneumatic controls and the like provided and the head pumping in the tank, it is possible to isolate the high voltage liquid from the rest of the machine without difficulty.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A machine for destroying plants with electricity, comprising
   a tank adapted to hold electrically conductive liquid therein,
   means for placing conductive liquid in said tank at high electrical potential, including a high voltage source of electricity,
   nozzle means for spraying high potential electrically conductive liquid on plants to be destroyed for transferring electricity from said high voltage source to ground through plants sprayed thereby, and
   means for grounding said high voltage source.

2. A machine as recited in claim 1 further comprising means for selectively supplying liquid from said tank to said nozzle means.

3. A machine as recited in claim 2 wherein said means for selectively supplying liquid from said tank to said nozzle means comprises a pneumatically operated valve disposed in a line from said tank to said nozzle means.

4. A machine as recited in claim 3 wherein said tank is electrically insulated, and further comprising means for introducing pressurized air over the liquid in said tank, said means including electrically nonconductive tubing leading from the exterior of said tank into said tank, and a common air pressure source being provided for introducing pressurized air over the liquid and for operating said pneumatically operated valve.

5. A machine as recited in claim 1 wherein said tank is electrically insulated, and further comprising means for introducing pressurized air over the liquid in said tank, said means including electrically non-conductive tubing leading from the exterior of said tank into said tank.

6. A machine as recited in claim 1 wherein said means for placing conductive liquid in said tank at high electrical potential comprises an electrode extending through a bushing of insulating material into said tank, and operatively connected to said high voltage source.

7. A machine as recited in claim 1 further comprising means for limiting the current output of said high-voltage source so that damage to said high-voltage source is prevented even during extended operation of said machine.

8. A machine as recited in claim 7 wherein said high voltage source comprises a fossil-fuel powered electric generator; a generally stable voltage electric power source; a voltage regulator operatively connected to said generally stable voltage electric power source and to an excitor field for said fossil-fuel powered generator; and a step-up transformer operatively connected to said high-voltage generator; and
  wherein said current limiting means comprises a variable resistor operatively connected between said voltage regulator and said excitor field.

9. A machine as recited in claim 8 further comprising first switch means disposed between said generally stable voltage electric power source and said voltage regulator, and second switch means operatively connected to said first switch means through a time-delay for short-circuiting said fossil-fuel generator and eliminating output current from said transformer due to residual magnetism in the field of said fossil-fuel generator.

10. A machine as recited in claim 7 further comprising means for controlling the no-load voltage of said high-voltage source to a maximum level.

11. A machine as recited in claim 10 wherein said high voltage source comprises a fossil-fuel powered electric generator; a generally stable voltage electric power source; a voltage regulator operatively connected to said generally stable voltage electric power source and to an excitor field for said fossil-fuel powered generator; and a step-up transformer operatively connected to said high-voltage generator; and wherein said controlling means comprise a variable transformer disposed in a sensing circuit for said voltage regulator, said transformer capable of reducing the no-load voltage to generally the same level as the full-load current limited voltage.

12. A machine for destroying plants with electricity comprising
  a tank adapted to hold electrically conductive liquid therein,
  a high voltage source of electricity,
  nozzle means for spraying energized electrically conductive liquid on plants to be destroyed for transferring electricity from said high voltage source to ground through plants sprayed thereby,
  means for grounding said high voltage source, and
  condition responsive means, responsive to plant position, for selectively supplying liquid from said tank to said nozzle means; said condition responsive means comprising a pneumatically operated valve disposed in an electrically insulated line from said tank to said nozzle means, a fluidic proximity switch for controlling said pneumatically operated valve, and an air pressure source for supplying said fluidic proximity switch.

13. A machine as recited in claim 12 wherein said condition responsive means further comprises a fluidic amplifier operatively connected between said fluidic proximity switch and said pneumatically operated valve, said air pressure source operatively connected to said fluidic amplifier.

14. A machine as recited in claim 13 further comprising means for directly supplying air from said air pressure source to said pneumatically operated valve for continuous operation of said valve independent of said fluidic proximity switch.

15. A machine as recited in claim 12 further comprising means for introducing pressurized air over liquid in said tank, said means including electrically nonconductive tubing leading from said air pressure source to the top of said tank.

16. A machine as recited in claim 12 wherein said nozzle means comprises a plurality of individual nozzles, and wherein a pneumatically operated valve and a fluidic proximity switch is associated with each nozzle.

17. A method of destroying plants with electricity comprising the steps of
  providing a tank of water with pressurized air over liquid in the tank,
  adding herbicide to the water to facilitate ionization thereof, the water, herbicide solution being an electrically conductive liquid,
  placing the electrically conductive liquid at high electrical potential within the tank, and
  spraying the high potential electrically conductive liquid on plants to be destroyed under the influence of a motive force provided by the pressurized air.

18. A machine for destroying plants with electricity comprising
  a tank adapted to hold electrically conductive liquid therein,
  a high voltage source of electricity,
  nozzle means for spraying energized electrically conductive on plants to be destroyed for transferring electricity from said high voltage source to ground through plants sprayed thereby,
  means for grounding said high voltage source,
  means for introducing pressurized air at a pressure greater than atmospheric pressure over the liquid in the tank for providing motive power for spraying the liquid from the tank, said means including an air pressure source exterior of the tank and electrically non-conductive tubing leading from the exterior of the tank into the tank,
  means for selectively supplying liquid from said tank to said nozzle means including a pneumatically operated valve disposed in an electrically non-conductive line from said tank to said nozzle means, and
  means for operatively connecting said air pressure source to said pneumatically operated valve.

* * * * *